(12) United States Patent
Wu et al.

(10) Patent No.: US 7,102,767 B2
(45) Date of Patent: Sep. 5, 2006

(54) PRINT MODULE FOR DIRECT MULTIPLE IMAGE FORMATTING AND PRINTING

(75) Inventors: Vincent Wu, Irvine, CA (US); Wichan Jarasrattanapaiboon, Fountain Valley, CA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 503 days.

(21) Appl. No.: 10/199,671

(22) Filed: Jul. 19, 2002

(65) Prior Publication Data

US 2004/0012813 A1    Jan. 22, 2004

(51) Int. Cl.
*G06F 15/00* (2006.01)

(52) U.S. Cl. .................... 358/1.13; 358/1.15

(58) Field of Classification Search .............. 358/1.1, 358/1.12, 1.13, 1.14, 1.15, 1.18
See application file for complete search history.

(56) References Cited

U.S. PATENT DOCUMENTS

| | | | |
|---|---|---|---|
| 4,806,978 A | 2/1989 | Nakatani et al. |
| 4,887,165 A | 12/1989 | Sato et al. |
| 4,943,868 A | 7/1990 | Yoshinaga et al. |
| 5,016,114 A | 5/1991 | Sakata et al. |
| 5,027,288 A | 6/1991 | Suzuki et al. |
| 5,054,096 A | 10/1991 | Beizer |
| 5,072,310 A | 12/1991 | Yamamato et al. |
| 5,105,284 A | 4/1992 | Sakata et al. |
| 5,133,024 A | 7/1992 | Froessl |
| 5,196,947 A | 3/1993 | Takahashi |
| 5,309,251 A | 5/1994 | Terajima |
| 5,339,134 A | 8/1994 | Nakamura et al. |
| 5,384,632 A | 1/1995 | Nakajima et al. |
| 5,499,113 A | 3/1996 | Tsuboi et al. |
| 5,537,517 A | 7/1996 | Wakabayashi et al. |
| 5,552,858 A | 9/1996 | Ujiie et al. |
| 5,574,533 A | 11/1996 | Itoh |
| 5,604,860 A | 2/1997 | McLaughlin et al. |
| 5,619,594 A | 4/1997 | Melen |
| 5,659,164 A | 8/1997 | Schmid et al. |
| 5,663,808 A | 9/1997 | Park |
| 5,666,211 A | 9/1997 | Tahara et al. |
| 5,703,962 A | 12/1997 | Niki et al. |
| 5,706,104 A | 1/1998 | Sugiura et al. |
| 5,717,439 A | 2/1998 | Levine et al. |
| 5,720,013 A | 2/1998 | Uda et al. |
| 5,726,883 A | 3/1998 | Levine et al. |
| 5,752,040 A | 5/1998 | Kaneko et al. |
| 5,754,307 A | 5/1998 | Miura |
| 5,760,775 A | 6/1998 | Shlut et al. |
| 5,764,886 A | 6/1998 | Danielson et al. |
| 5,771,395 A | 6/1998 | Walker et al. |
| 5,790,119 A | 8/1998 | Shlut et al. |
| 5,821,929 A | 10/1998 | Shimizu et al. |
| 5,822,082 A | 10/1998 | Sato et al. |
| 5,838,883 A | 11/1998 | Pekelman |

(Continued)

*Primary Examiner*—Mark Wallerson
(74) *Attorney, Agent, or Firm*—Tucker Ellis & West LLP

(57) ABSTRACT

Printing architecture for direct printing of an imaged document in a print controller. Document image data is generated representative of document information of an input document. A conversion module is called to format the document image data into a second data, which second data includes the document information of the input document. The second data is enqueued for output, and output as an output document at the highest output speed of the print controller.

18 Claims, 2 Drawing Sheets

U.S. PATENT DOCUMENTS

| | | |
|---|---|---|
| 5,872,569 A | 2/1999 | Salgado et al. |
| 5,911,044 A | 6/1999 | Lo et al. |
| 5,913,072 A | 6/1999 | Wieringa |
| 5,923,437 A | 7/1999 | Itoh |
| 5,930,467 A | 7/1999 | Morita |
| 5,982,502 A | 11/1999 | Jinnai |
| 5,991,516 A * | 11/1999 | Desmond et al. .......... 358/1.17 |
| 6,061,502 A | 5/2000 | Ho et al. |
| 6,069,706 A | 5/2000 | Kajita et al. |
| 6,111,659 A | 8/2000 | Murata |
| 6,112,014 A | 8/2000 | Kane |
| 6,115,739 A | 9/2000 | Ogawa et al. |
| 6,124,939 A | 9/2000 | Toyoda et al. |
| 6,167,453 A | 12/2000 | Becker et al. |
| 6,194,712 B1 | 2/2001 | Sucmoto et al. |
| 6,208,432 B1 | 3/2001 | Kohtani et al. |
| 6,248,996 B1 | 6/2001 | Johnson et al. |
| 6,256,662 B1 | 7/2001 | Lo et al. |
| 6,295,139 B1 | 9/2001 | Yamauchi et al. |
| 6,301,611 B1 | 10/2001 | Matsumoto et al. |
| 6,308,023 B1 | 10/2001 | Nomura et al. |
| 6,321,266 B1 | 11/2001 | Yokomizo et al. |
| 6,330,067 B1 | 12/2001 | Murata |
| 6,504,960 B1 * | 1/2003 | Takahashi ................... 382/305 |
| 2001/0011276 A1 | 8/2001 | Durst, Jr. et al. |
| 2001/0014908 A1 | 8/2001 | Lo et al. |
| 2001/0030766 A1 | 10/2001 | Yamamoto |
| 2001/0043362 A1 | 11/2001 | Hull et al. |
| 2001/0043369 A1 | 11/2001 | Melen |
| 2001/0050782 A1 | 12/2001 | Niitsuma et al. |
| 2001/0054106 A1 | 12/2001 | Anderson et al. |

* cited by examiner

PRINT MODULE FOR DIRECT MULTIPLE IMAGE FORMATTING AND PRINTING

BACKGROUND OF THE INVENTION

This invention is related to print controllers, and more specifically, to a print controller having a capability for scanning and directly printing the scanned document image.

Conventionally, print controllers (also known as network printers) do not have the capability of directly printing scanned input documents. A scanned image must be ported to external software (via e-mail or a TWAIN driver) before the image can be printed from the controller. Document image formats in conventional implementations are also more restrictive, to scanned image formats such as TIFF, JPG, BMP, PNG, PDF, etc.

Users find the conventional architecture inconvenient, since use of the external software is more time consuming for printing the scanned image. Utilizing a direct print methodology for printing an image directly from the controller repository would be much faster. Furthermore, there would be no network traffic between the print controller and the external software.

What is needed is a print module that facilitates direct image printing on the print controller from a wide variety of image formats.

SUMMARY OF THE INVENTION

The present invention disclosed and claimed herein, in one aspect thereof, comprises printing architecture for direct printing of an imaged document in a print controller. Document image data is generated representative of document information of an input document. A conversion module is called to format the document image data into a second data, which second data includes the document information of the input document. The second data is enqueued for output, and output as an output document at the highest output speed of the print controller.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION OF THE INVENTION

The disclosed direct print architecture solves the aforementioned need by allowing a document image to be printed directly from the print controller. The direct image print tool is capable of printing any of the popular image formats that are utilized in the print controller scanner system, input from the network, a CD-ROM media, and digital camera flash memory.

Figure 1:
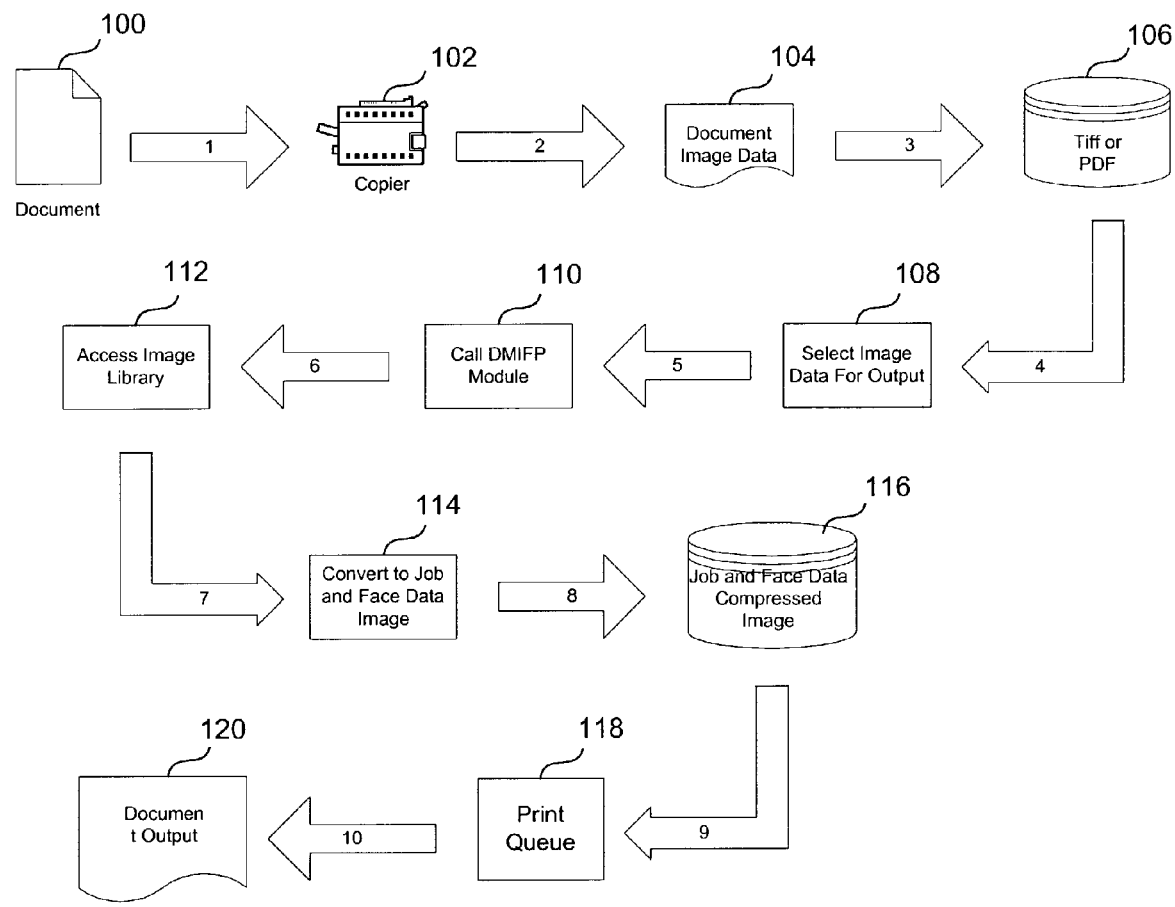
FIG. 1 illustrates a flow diagram of the process for generating and outputting a scanned document, according to a disclosed embodiment.

Referring now to FIG. 1, there is illustrated a flow diagram of the process for generating and outputting a scanned document, according to a disclosed embodiment. The print controller may include a number of document handling and processing subsystems, including, but not limited to a copier subsystem 102 that utilizes document scanning to generate a document image imposed on an output document, a facsimile subsystem for receiving fax data imposed on a document or for inputting a document into the facsimile imaging subsystem for transmission therefrom, a printing subsystem, and a web hosting subsystem. In this particular example, the document 100 is input to the copier subsystem 102. The methodology by which the document information of the document is input can be by manual insertion of the document 100 by the user, and electronically transmitting the document information to the print controller in the form of document image data over a wired or wireless network on which the print controller is disposed. In the latter case, the document image data is of a format suitable for use with the disclosed direct print architecture, and which can be generated from, for example, a remote facsimile unit, and a software program that resides on a remote client that can image the document information and transmit the document image data to the print controller. The transmission means can be a communication client such as e-mail, or direct file transfer via suitable network file transfer protocols.

In any case, a scanner mechanism of the print controller can be utilized to scan the input document 100 to convert the document image data 104 into one of many types of file formats, e.g., TIFF or PDF file format. The document image data 104 is then stored in a document image data repository on a mass storage device 106 local to the print controller. The mass storage device 106 can be a hard disk drive, tape drive, optical drive, CD-ROM, etc. Note that RAM memory or non-volatile memory can also be suitably implemented as the mass storage means where desired. It is preferable to utilize a mass storage device 106 with relatively fast access time so that the document image data 104 can be retrieved quickly when needed for output processing by the print controller.

During the scanning process, the user is provided with a selection via a front panel interface to choose to convert the scanned document image data 104 to a second image format (i.e., a job and face data image format) and store the second image format on the print controller in a repository for later printing. In a manual mode, the user can manually access the repository of document image data 106 via the front panel interface of the print controller, as indicated in a selection block 108, and select one or more of the stored document image data 104 for output. Once selected, a scan module of the print controller calls a Direct Multiple Image Format Print (DMIFP) module to perform a conversion process, as indicated in a call block 110. The DMIFP module accesses an image library 112 to convert the document image data 104 to a controller job consisting of job record and face data 114 in the format of a second compressed image data format. The job and face image data 114 in the form of the second image data is then stored back on a storage device 116 of the print controller, and enqueued in a print queue 118 for output at the highest possible printing speed of the copier subsystem 102. Alternatively, the converted image print job may be stored on the storage device 116 of the print controller for later printing at the highest possible printing speed of the copier system.

The input document 100 may also be printed out automatically in response to the document being input to the copier subsystem 102. In this case, the DMIFP module will be called to convert the scanned document image data 104 to the second image format 114.

Note that when a document 100 is input, the document 100 may be a single page or comprise a compilation of many pages of information, wherein each page is scanned to generate a respective image file of face data. The face data image file may be in the format of TIFF, PNG, PDF, JPG, etc. Once converted by the DMIFP module to the second image data 114, and stored on the local storage unit 116, the document will then be printed at the highest possible speed. If printed in this first document image data format 104 at this time, before conversion into the second image data format, the time required for printing will be longer than if first converted to the second image data format by the DMIFP module and printed. The print controller can operate in a synchronous mode, where the document output 120 occurs only after all face data 114 has been converted. The print controller can also operate in an asynchronous mode where the converted second image data is sent to the output one page at a time, as the document pages are converted, thus the document output 120 occurs much sooner.

As indicated hereinabove, the scanned document image data can be printed directly without using external software. This direct print feature (i.e., printing from the converted second image data format stored in the print controller) can be implemented with the introduction of very low CPU overhead, since creating the job record does not require high CPU processing time. The document 100 can then be printed later at the highest possible printing speed of the copier system with low CPU overhead, since the document image data 104 has been DMIFP-converted to job and face data 116 as the second image data, and stored on the print controller. The DMIFP module supports a wide variety of image formats, e.g., PDF, TIFF, JPG, etc. The print controller is suitably adaptable such that a user may also view thumbnail images of the scanned document images via an external display (e.g., LCD, vacuum tube, etc.) that can be operatively connected to the print controller via a video display port.

Print job types and options supported include: print mode; normal mode—a conventional print job; private mode—a print job that requires a user to enter a pass code at the copier user interface panel before the job will be printed out; schedule mode—a print job is scheduled to be printed on the copier at a specified date and time; and proof print—a multiple-copy print job that prints the first copy of the print job first, so that the user can verify the contents of print job before printing the rest of the copies. Finishing selections include collating, stapling, hole punching, cascading, and output bin. Additionally, paper size and cassette selection options are available.

Figure 2:
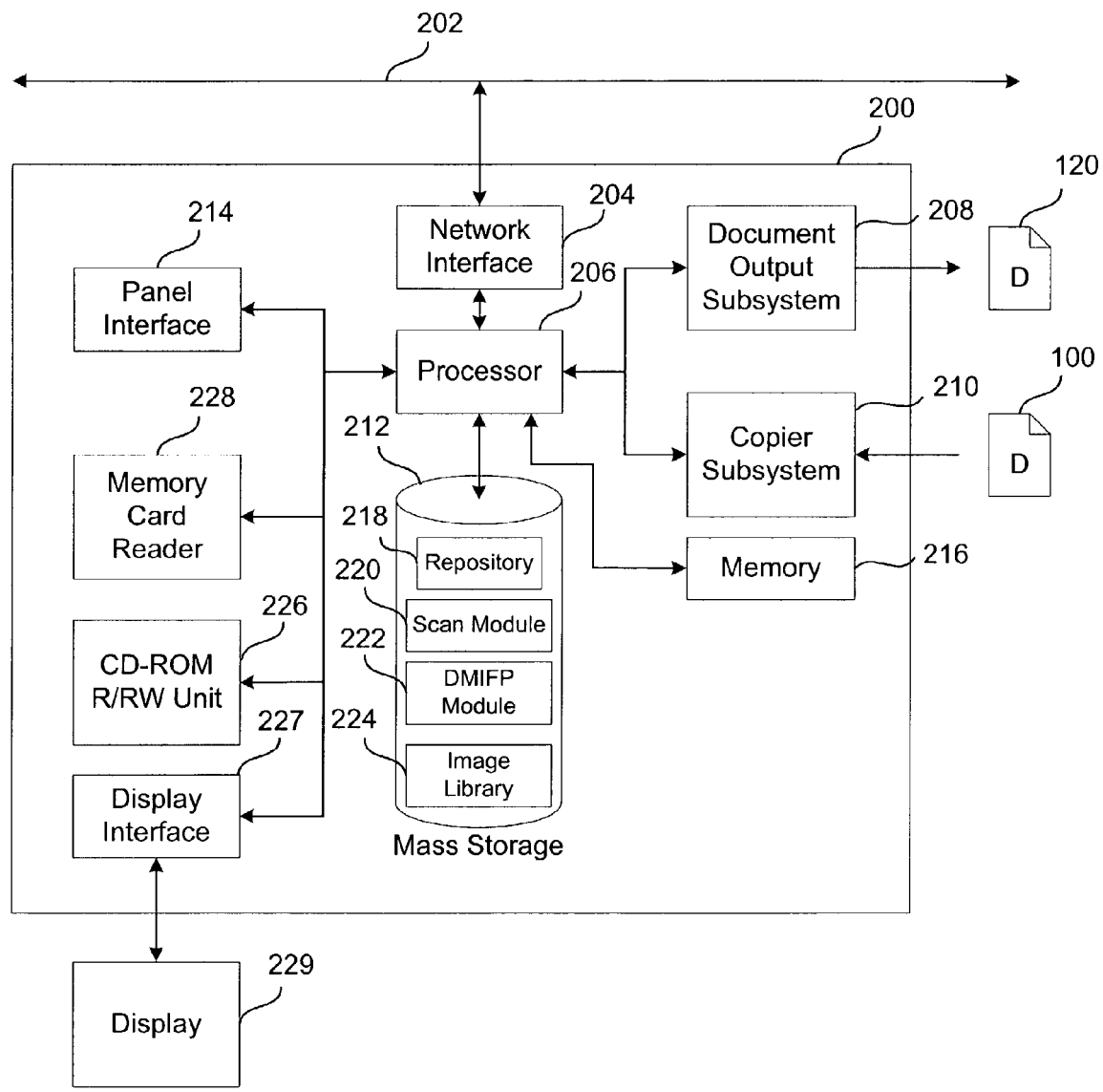
FIG. 2 illustrates a block diagram of a print controller system incorporating the disclosed direct print architecture.

Referring now to FIG. 2, there is illustrated a block diagram of a print controller system 200 incorporating the disclosed direct print architecture. The print controller system 200 is operatively disposed on a network 202 in wired and/or wireless communication scheme. In furtherance thereof, the print controller 200 includes a network interface 204 for interfacing to the network 202, and processing suitable network protocols for the wired or wireless scenario. The print controller 200 includes a central processor 206 for monitoring and controlling system components and executing instructions, which system components include a document output subsystem 208, a copier subsystem 210, mass storage unit 212, and user interface panel 214. The processor 206 utilizes a fast memory 216 for storing instructions and data during the monitor and control of all system components, and execution of instructions of the print controller system 200.

The copier subsystem 116 includes an input for receiving the document 100 into the print controller system 200. The document output subsystem 208 includes means for outputting the output document 120 from the print controller system 200.

The mass storage unit 212 provides storage for the document image repository 218, scan module 220, DMIFP module 222, image library 224, print controller operating system, and other software, drivers, and data required for operating the print controller 200 in accordance with the disclosed direct imaging print architecture. Other means may be utilized be store such software, such as non-volatile EEPROM (electronically erasable programmable read-only memory) or comparable technologies, insofar as the program contents of the EEPROM can be accessed at a speed suitable for operation of the print controller 200 according to the disclosed direct print architecture.

Other data input and storage devices that can be incorporated in the print controller system 200 include a CD-ROM read/write unit 226 for providing a means for exchanging CD data, and a flash memory card reader unit 228 for reading image data from digital camera memory cards. Other portable memory reading unit technologies may also be installed and/or connected to the print controller system 200 limited only by the available chassis space, where local installation is desired, or available local interface connections, for example, USB, IEEE 1394, etc.

As indicated hereinabove, the print controller 200 is suitably adapted to accommodate an external display 229 for viewing of the thumbnail sketches of the documents before selecting the document for output. In furtherance thereof, the print controller 200 includes a display interface 227 for interfacing the display 229 to the processor 206, and other internal systems.

Although the preferred embodiment has been described in detail, it should be understood that various changes, substitutions, and alterations can be made therein without departing from the spirit and scope of the invention as defined by the appended claims.

What is claimed is:

1. A method of direct printing of an imaged document in a print controller, comprising the steps of:

generating document image data representative of document information of an input document in a first data format;

communicating the document image data in the first data format to a storage associated with a document processing controller;

initiating a formatting module within the document processing controller to format the document image data into a second data format corresponding to a native format of a document rendering device associated with the document processing controller;

after completion of the second format of the document image data, storing the document image in the second data format in the associated data storage as a converted document image;

receiving, from an associated user, a document output request representative of a selected output for the converted document image;

receiving mode data representative of a selected one of an asynchronous mode operation and a synchronous mode operation;

communicating the converted document image to a selected document processing device in accordance with a received document output request; and generating, from the converted document image, a document output from the selected document processing device in accordance with received mode data.

2. The method of direct printing of an imaged document in a print controller of claim 1 wherein the second data format is a compressed data format.

3. The method of direct printing of an imaged document in a print controller of claim 1 wherein the second data format includes TIFF, PDF, JPG, and PNG.

4. The method of direct printing of an imaged document in a print controller of claim 1 wherein the associated data storage includes a hard disk, tape drive, optical drive, CD-ROM, RAM memory, and non-volatile memory.

5. The method of direct printing of an imaged document in a print controller of claim 1 further comprising the step of receiving selection data from an associated user representative of at least one selected document for generating.

6. The method of direct printing of an imaged document in a print controller of claim 5 further comprising the step of displaying data representative of an image of at least one document for generating.

7. The method of direct printing of an imaged document in a print controller of claim 1 wherein the step of generating a document output is performed automatically in response to receiving a document output request.

8. The method of direct printing of an imaged document in a print controller of claim 1 wherein the step of generating a document output is performed in response to receiving input data from an associated user to commence document output.

9. The method of direct printing of an imaged document in a print controller of claim 1 wherein the step of generating a document output is performed at the highest output speed of the print controller.

10. A system of direct printing of an imaged document in a print controller, comprising the steps of:
    means adapted for generating document image data representative of document information of an input document in a first data format;
    means adapted for communicating the document image data in the first data format to a storage associated with a document processing controller;
    means adapted for initiating a formatting module to format the document image data into a second data format corresponding to a native format of a document rendering device associated with the document processing controller;
    after completion of a second format of the document image data, means adapted for storing the document image in the second data format in an associated data storage as a converted document image;
    means adapted for receiving a document output request representative of a selected output for the converted document image;
    means adapted for receiving mode data representative of a selected one of asynchronous mode operation and a synchronous mode operation;
    means adapted for communicating the converted document image to a selected document processing device in accordance with a received document output request from an associated user; and
    means adapted for generating, from the converted document image, a document output from the selected document processing device in accordance with the mode data.

11. The system of direct printing of an imaged document in a print controller of claim 10 wherein the second data format is a compressed data format.

12. The system of direct printing of an imaged document in a print controller of claim 10 wherein the second data format includes TIFF, PDF, JPG, and PNG.

13. The system of direct printing of an imaged document in a print controller of claim 10 wherein the associated data storage includes a hard disk, tape drive, optical drive, CD-ROM, RAM memory, and non-volatile memory.

14. The system of direct printing of an imaged document in a print controller of claim 10 further comprising means adapted for receiving selection data from an associated user representative of at least one selected document for generating.

15. The system of direct printing of an imaged document in a print controller of claim 14 further comprising means adapted for displaying data representative of an image of at least one document for generating.

16. The system of direct printing of an imaged document in a print controller of claim 10 wherein the step of generating a document output is performed automatically in response to receiving a document output request.

17. The system of direct printing of an imaged document in a print controller of claim 10 wherein the step of generating a document output is performed in response to receiving input data from an associated user to commence document output.

18. The system of direct printing of an imaged document in a print controller of claim 10 wherein the step of generating a document output is performed at the highest output speed of the print controller.

* * * * *